United States Patent [19]

Dileo et al.

[11] Patent Number: 5,561,481
[45] Date of Patent: Oct. 1, 1996

[54] EYEGLASS FRAME FOR SWAPPING A LENS BETWEEN EYES

[76] Inventors: Frank Dileo, P.O. BOX 1668, Bridghampton, N.Y. 11932; Peter Michalos, 137 Hampton Rd., South Hampton, N.Y. 11968

[21] Appl. No.: 419,392

[22] Filed: Apr. 10, 1995

[51] Int. Cl.⁶ ..................... G02C 9/02
[52] U.S. Cl. ..................... 351/59
[58] Field of Search ............... 351/59, 57, 54, 351/90

[56] References Cited

U.S. PATENT DOCUMENTS

| | | | |
|---|---|---|---|
| 773,750 | 11/1904 | Kay | 351/57 |
| 3,252,747 | 5/1966 | Robins | 351/59 |
| 3,383,155 | 5/1968 | Bourke | 351/59 |
| 3,495,898 | 2/1970 | Del Vecchio | 351/41 |
| 3,838,913 | 10/1974 | Schwarz | 351/47 |
| 3,840,294 | 10/1974 | Knier | 351/59 |
| 4,373,789 | 2/1983 | Roberts | 351/158 |
| 4,405,213 | 9/1983 | Kolkmann | 351/59 |
| 4,493,538 | 1/1985 | Tolliver | 351/57 |
| 4,880,302 | 11/1989 | Meillet | 351/59 |
| 5,373,331 | 12/1994 | Vallalla et al. | 351/57 |

OTHER PUBLICATIONS

Hilco, "Frames Product Guide" (total of two pp.) Aug. 1986.
Hilco, "Frames Product Guide" (total of two pp.) Dec. 1989.

*Primary Examiner*—William L. Sikes
*Assistant Examiner*—James A. Dudek
*Attorney, Agent, or Firm*—Jerome D. Jackson

[57] ABSTRACT

A frame assembly for applying makeup to presbyopic eyes. The assembly includes a single lens that rotates between a position in optical registry with the wearer's left eye and another position position in optical registry with the wearer's right eye.

18 Claims, 3 Drawing Sheets

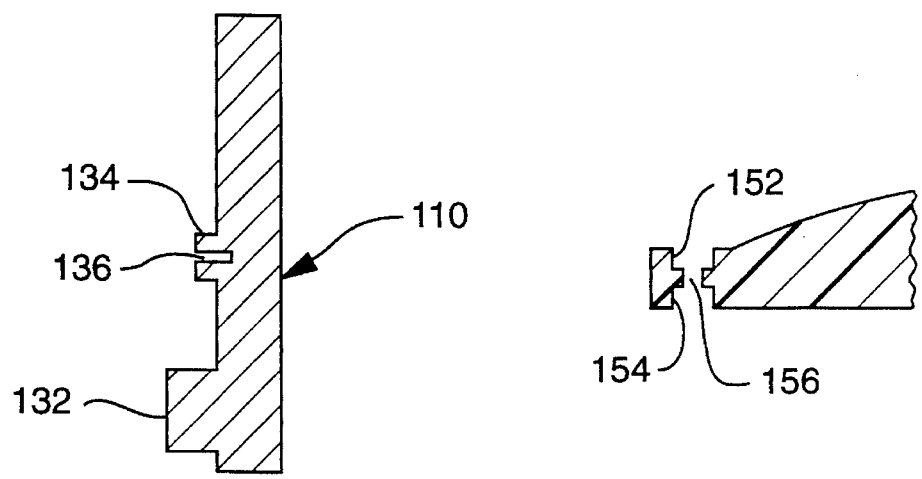
FIG. 4
FIG. 7
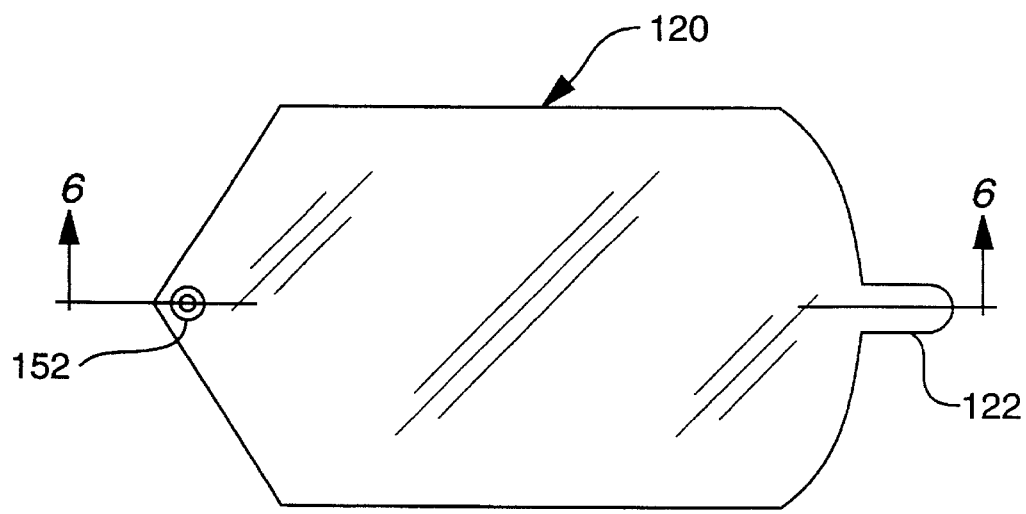
FIG. 5
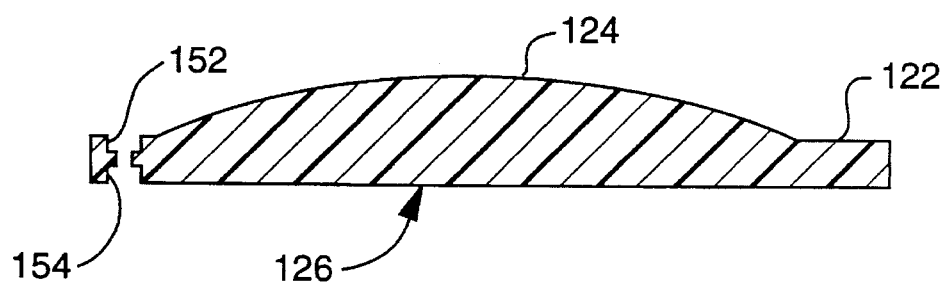
FIG. 6

5,561,481

EYEGLASS FRAME FOR SWAPPING A LENS BETWEEN EYES

BACKGROUND OF THE INVENTION

1. Field of the Invention

This invention relates generally to a device for applying substances to the face, and, more particularly, to an eyeglass frame assembly for applying substances, such as makeup, to areas around the eyes.

2. Description of Related Art

Placement of makeup by a person having presbyopia or refractive error can be challenging, resulting in misapplication of the makeup and the risk of poking the eye and scratching the cornea. Such a person typically uses a magnifying mirror and bright light, because conventional eyeglass frames would act as a physical obstruction.

SUMMARY OF THE INVENTION

It is an object of the present invention to provide a vision magnifying apparatus that allows efficient application of makeup.

To achieve this and other objects of the present invention, a frame assembly comprises a support including a left eye frame and a right eye frame, the support defining a top of the frame assembly; an arm coupled to the left eye frame; another arm coupled to the right eye frame; and a lens rotatably coupled to the support, allowing rotation in a vertical plane between a first position in the left eye frame and a second position in the right eye frame.

According to another aspect of the present invention, a method for applying a substance to each a face having first and second eyes comprises the steps of viewing the face with the first eye through an optical path including a lens and a mirror; applying the substance to an area of the face in proximity to the second eye; rotating the lens in a vertical plane; viewing the face with the second eye through and optical path including the lens and the mirror; and applying the substance to an area of the face in proximity to the first eye.

BRIEF DESCRIPTION OF THE DRAWINGS

FIG. 4 is a section view of part of the preferred frame assembly, taken along the line 4—4 shown in FIG. 3.

FIG. 5 is a plan view of the lens of the preferred frame assembly.

FIG. 6 is a view of the lens of the preferred frame assembly, taken along the line 6—6 shown in FIG. 5.

FIG. 7 is a further enlarged view of the lens shown in FIG. 6.

The accompanying drawings which are incorporated in and which constitute a part of this specification, illustrate embodiments of the invention and, together with the description, explain the principles of the invention, and additional advantages thereof.

DESCRIPTION OF THE PREFERRED EMBODIMENT

Figure 1:
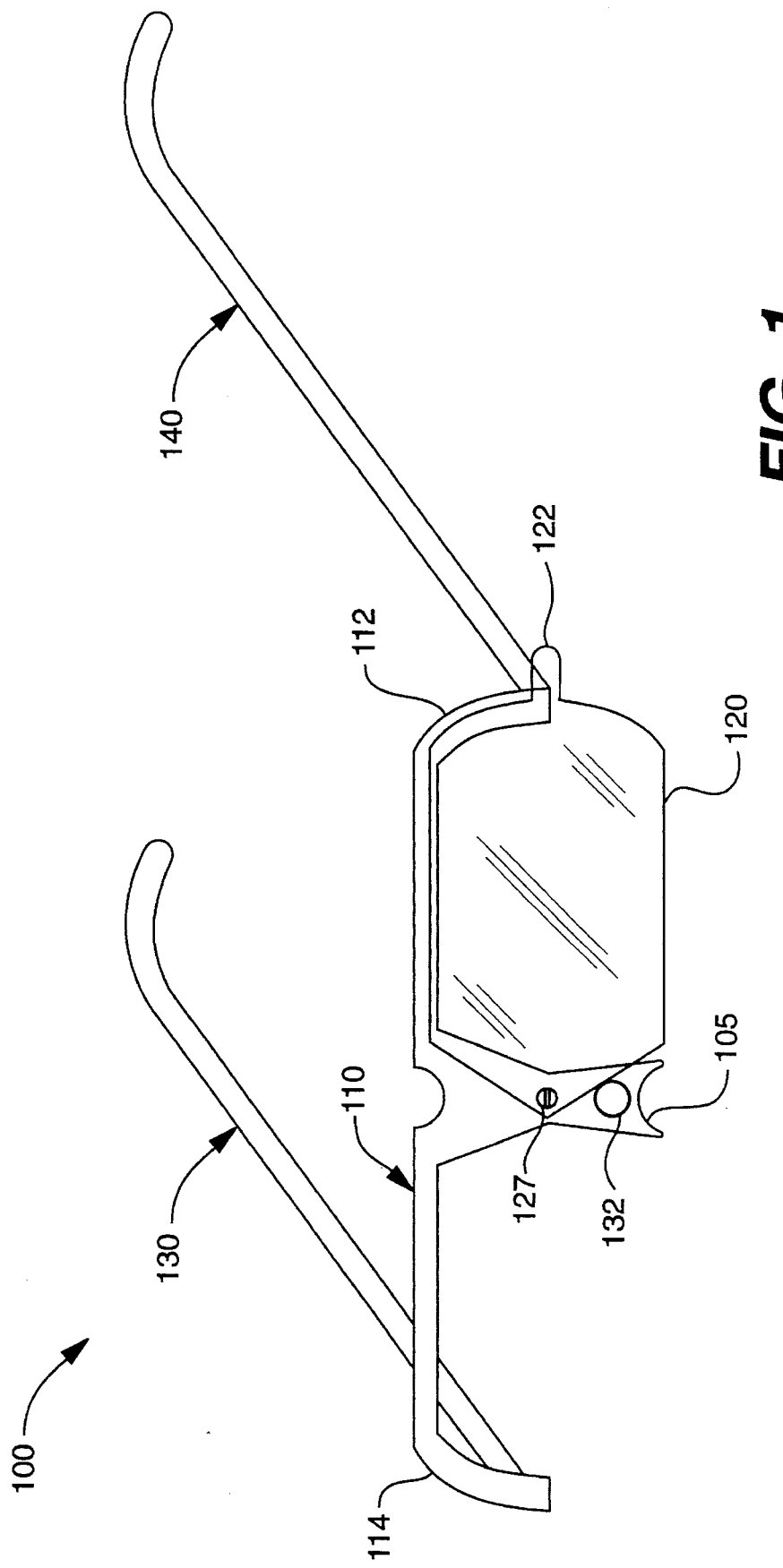
FIG. 1 is a perspective view of an eye glass frame assembly configured to magnify vision in the left eye, according to the preferred embodiment of the present invention.

FIG. 1 shows frame assembly 100 in perspective, according to the preferred embodiment of the invention. Frame assembly 100 includes horizontal support 110 having a left eye frame 112 and a right eye frame 114. Screw 127 extends out of horizontal support 110 and through a hole in lens 120. Screw 127 acts as an axel about which lens 120 rotates, meaning that lens 120 is rotatably coupled to horizontal support 110 by screw 127. Lens 120 abuts lens resting block 132, which limits the rotation range of lens 120. Lens rest 132 is in vertical alignment with screw 127.

Arm 140 is coupled to a downward-extending part of the left eye frame 112. Arm 130 is coupled to a downward-extending part of the right frame 114. Because of these couplings of arms 130 and 140, frame assembly 100 tends to sit high on the wearer's face, allowing lens 120 to clear the wearer's forehead when lens 120 rotates. Thus, frame assembly 100 need not be removed when lens 120 rotates between positions.

In FIG. 1, frame assembly 100 is configured to magnify vision in the left eye, while leaving the right eye relatively unobstructed. Each of left eye frame 112 and right eye frame 114 defines an open, concave shape (a U-shape) facing away from the top of the frame assembly 100. Because horizontal support 110 extends only along the top of the frame assembly 100, not the bottom, the wearer has easy access to her eyes using a tool such as a mascara brush.

Figure 2:
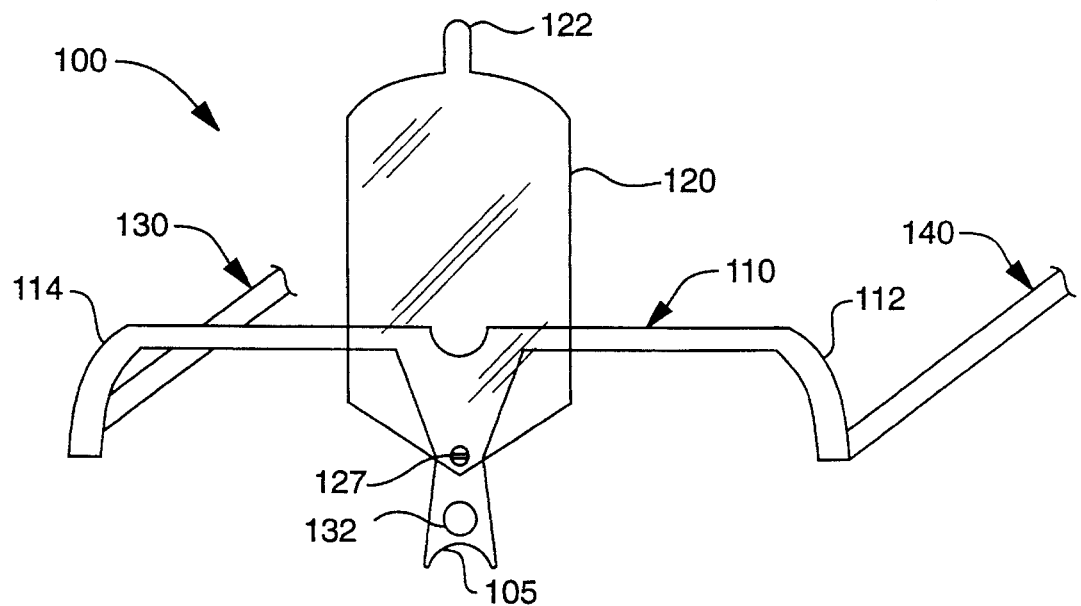
FIG. 2 is a perspective view illustrating a change in configuration of the preferred frame assembly.

FIG. 2 shows frame assembly 100 while changing configuration by rotating lens 120 in a vertical plane. Because the user looks through lens 120 in a common direction, regardless of whether lens 120 is in left eye frame 112 or right eye frame 114, lens 120 may be asymmetrical, as discussed below.

Figure 3:
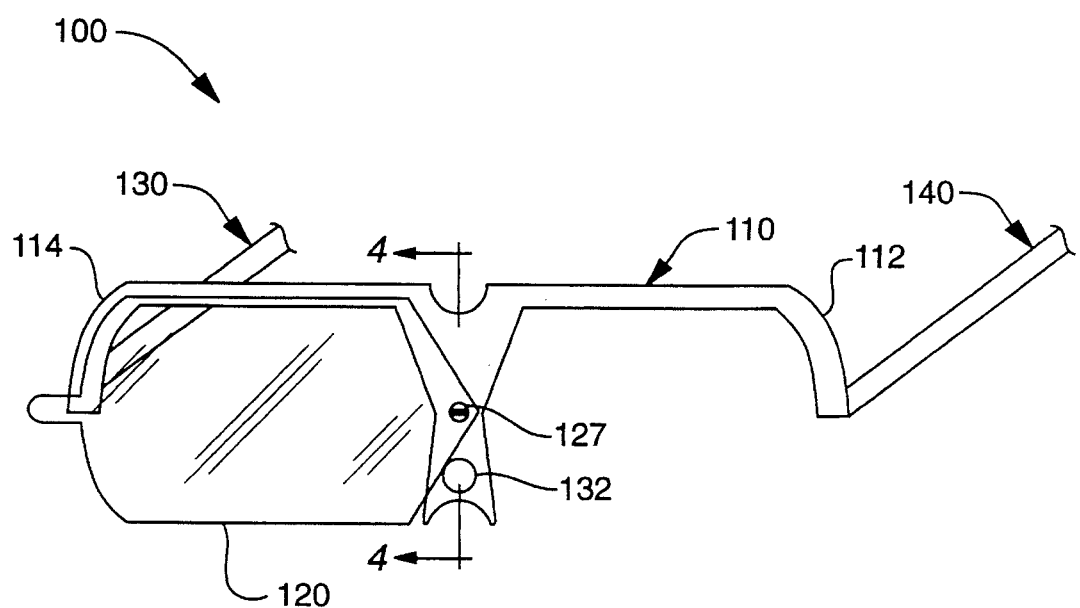
FIG. 3 is a perspective view of the preferred frame assembly configured to magnify vision in the right eye.

FIG. 3 shows frame assembly 100 configured to magnify vision in the right eye, while leaving the left eye relatively unobstructed.

In other words, frame assembly 100 includes a horizontal support 110 including a left eye frame 112 and a right eye frame 114. Horizontal support 110 defines the top of frame assembly 100. Horizontal support 110 extends along the top of the frame assembly 100 only, allowing unobstructed access to the eyes from below. Lens 120 is rotatably coupled to the horizontal support 110, allowing rotation in a vertical plane between a first position in the left eye frame 112 and a second position in the right eye frame 114. Thus, lens 120 rotates between a position in optical registry with the wearer's left eye and another position in optical registry with the wearer's right eye.

FIG. 4 shows a view of horizontal support 110, taken along the line 4—4 shown in FIG. 3. Shim block 134 supports lens 120, displacing lens 120 away from horizontal support 110. Screw hole 136 has threads that mate with threads on screw 127. Resting block 132 limits the rotation range of lens 120.

FIG. 5 shows lens 120 including handle projection 122 integrally formed with lens 120. In other words, lens 120 includes an optical material defining a handle projection 122. Lens 120 also defines a recess 152 having a width slightly greater than the width of the head of screw 127.

FIG. 6 shows a side view of lens 120 taken along the line 6—6 shown in FIG. 5. Lens 120 defines a recess 154 having a width slightly greater than the width of shim block 134. Lens 120 is asymmetrical, defining a plano-convex shape. Convex face 124 and recess 152 are on one side of lens 120, and planar face 126 and recess 154 are on the other side of lens 120. Lens 120 has a power between 0.50 and 9.00 diopters.

FIG. 7 shows a further enlarged view of the pivot area of lens 120 including recess 152, recess 154, and through hole 156. When frame assembly 100 is complete, as shown in FIGS. 1–3, through hole 156 encompasses a smooth, unthreaded, portion of screw 127.

To apply makeup to the right eye, the user places lens 120 in left eye frame 112, as shown in FIG. 1, to observe the right side of the face through a mirror while looking through the left eye. To apply makeup to the left eye, the user places lens 120 in right eye frame 114, as shown in FIG. 3, to observe the left side of the face through the mirror while looking through the right eye. In other words, the user applies a substance to her face by viewing her face with her left eye through an optical path including lens 120 and a mirror; applying the substance to an area of the face in proximity to the right eye; rotating lens 120 in a vertical plane; viewing the face with the right eye through and optical path including lens 120 and the mirror; and applying the substance to an area of the face in proximity to the left eye.

Thus, the preferred frame assembly allows application of makeup to both sides of the face, while employing only a single lens. The preferred frame assembly also allows application of eydrops, contact lens, and allows removal of eye lashes or eyebrow hair.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicants' general inventive concept. The invention is defined in the following claims.

What is claimed is:

1. A frame assembly comprising:

a support including a left eye frame and a right eye frame, the support defining a top of the frame assembly;

an arm coupled to the left eye frame;

another arm coupled to the right eye frame; and a lens rotatably coupled to the support, allowing rotation in a vertical plane between a first position in optical registry with the person's left eye and a second position in optical registry with the person's right eye.

2. The frame assembly of claim 1 further comprising a nose rest; and an axle in vertical alignment with the nose rest, wherein the lens is rotatably coupled to the axel.

3. The frame assembly of claim 1 wherein each of the left and right eye frames defines an open, concave shape facing away from the top of the frame assembly.

4. The frame assembly of claim 1 further including a member on the support for limiting the rotation of the lens.

5. The frame assembly of claim 1 wherein the lens defines a hole and the frame assembly further includes an axle extending from the support and through the hole.

6. The frame assembly of claim 1 wherein the lens includes an optical material defining a handle projection.

7. The frame assembly of claim 1 wherein the lens defines a plano-convex shape.

8. A frame assembly for wearing on the face of a person, the frame assembly comprising:

a support including a left eye portion and a right eye portion, the support defining the top of the frame assembly;

a left arm coupled to the left eye portion of the support;

a right arm coupled to the right eye portion of the support; and an optical part having a proximal portion and a distal portion, the proximal portion being rotatably coupled to the support to allow rotation of the optical part in a vertical plane between a first position wherein the optical part is in optical registry with the wearer's left eye and the distal portion is closer to the left arm than to the right arm, and a second position wherein the optical part is in optical registry with the wearer's right eye and the distal portion is closer to the right arm than to the left arm.

9. The frame assembly of claim 8 wherein the optical part includes a lens.

10. The frame assembly of claim 8 further comprising a nose rest; and an axle in vertical alignment with the nose rest, wherein the optical part is coupled to the axle.

11. The frame assembly of claim 10 wherein the optical part includes a lens.

12. The frame assembly of claim 8 further comprising a nose rest; and an axle in vertical alignment with the nose rest, wherein the optical part is rotatably coupled to the axel.

13. The frame assembly of claim 12 wherein the optical part includes a lens.

14. The frame assembly of claim 8 wherein the optical part defines a hole and the frame assembly further includes an axle extending from the support and through the hole.

15. The frame assembly of claim 14 wherein the optical part includes a lens.

16. The frame assembly of claim 8 wherein the distal portion includes a handle projection.

17. The frame assembly of claim 16 wherein the optical part includes a lens.

18. The frame assembly of claim 8 wherein the optical part includes a lens defining a plano-convex shape.

* * * * *